(12) United States Patent
Miyamoto

(10) Patent No.: US 10,942,916 B2
(45) Date of Patent: Mar. 9, 2021

(54) FRAUD PREVENTION VIA DATABASE REFERENCING

(71) Applicant: International Business Machines Corporation, Armonk, NY (US)

(72) Inventor: Kohtaroh Miyamoto, Tokyo (JP)

(73) Assignee: International Business Machines Corporation, Armonk, NY (US)

( * ) Notice: Subject to any disclaimer, the term of this patent is extended or adjusted under 35 U.S.C. 154(b) by 167 days.

(21) Appl. No.: 16/179,907

(22) Filed: Nov. 3, 2018

(65) Prior Publication Data

US 2020/0142984 A1 May 7, 2020

(51) Int. Cl.
| | |
|---|---|
| G06F 17/00 | (2019.01) |
| G06F 16/23 | (2019.01) |
| H04L 9/06 | (2006.01) |
| G06F 16/21 | (2019.01) |

(52) U.S. Cl.
CPC .......... *G06F 16/2365* (2019.01); *G06F 16/21* (2019.01); *G06F 16/2379* (2019.01); *H04L 9/0637* (2013.01)

(58) Field of Classification Search
CPC .. G06F 16/2365; G06F 16/21; G06F 16/2379; H04L 9/0637; H04L 9/3297; H04L 9/3247; H04L 9/3239; H04L 2209/38
See application file for complete search history.

(56) References Cited

U.S. PATENT DOCUMENTS

| | | | |
|---|---|---|---|
| 2016/0335533 | A1 | 11/2016 | Davis et al. |
| 2016/0342994 | A1 | 11/2016 | Davis |
| 2018/0205552 | A1* | 7/2018 | Struttmann ........... G06F 21/602 |
| 2019/0147081 | A1* | 5/2019 | Demla .................. G06F 16/248 707/722 |
| 2019/0327216 | A1* | 10/2019 | Walters ............... H04L 63/0442 |
| 2019/0379543 | A1* | 12/2019 | Sethi ..................... H04L 9/3239 |
| 2019/0379754 | A1* | 12/2019 | Krishnaswamy ..... H04L 67/289 |
| 2020/0050595 | A1* | 2/2020 | Sun ....................... H04L 9/3239 |
| 2020/0137064 | A1* | 4/2020 | Wu ....................... H04L 9/0637 |

OTHER PUBLICATIONS

I. Nath, "Data Exchange Platform to Fight Insurance Fraud on Blockchain," 2016 IEEE 16th International Conference on Data Mining Workshops (ICDMW), Barcelona, pp. 821-825, doi: 10.1109/ICDMW.2016.0121, Dec. (Year: 2016).*

(Continued)

*Primary Examiner* — Greta L Robinson

(57) ABSTRACT

An example operation may include one or more of receiving an entry intended for a database, identifying a plurality of data fields associated with the entry, identifying a plurality of data fields associated with one or more previously committed entries, adding the entry to the database with a temporary status, determining whether one or more of the plurality of data fields associated with the entry match one or more of the plurality of data fields associated with the one or more previously committed entries, and responsive to determining whether the match occurred, determining whether to commit the entry to the database and a status to assign the entry.

20 Claims, 16 Drawing Sheets

(56) References Cited

OTHER PUBLICATIONS

R. Patel, A. Sethia and S. Patil, "Blockchain—Future of Decentralized Systems," 2018 International Conference on Computing, Power and Communication Technologies (GUCON), Greater Noida, Uttar Pradesh, India, pp. 369-374, doi: 10.1109/GUCON.2018.8675091, Sep. (Year: 2018).*

Nath et.al, Fight Insurance Fraud: Data Sharing with Blockchain Technology, Source: 01.ibm.com, Publisher: public.dhe.ibm.com, Sep. 2016.

Sreevallabhan, Blockchain Assisted Smart Cards and Use of Distributed Storage for Efficient Insurance Policy and Claims Management, completed specification submitted on Jan. 31, 2017.

* cited by examiner

150

| ENTRIES 160 ||||||||
|---|---|---|---|---|---|---|---|
| ID 162 | AGENCY 164 | FIRST NAME 166 | LAST NAME 168 | ADDRESS 172 | PHONE # 174 | ITEM ID 176 | STATUS 178 |
| 0001 | ABC | X43U2Q | FA23JOI | 4KJ32 | 908JLKJ | 8LKJ56,M | RECEIVED |
| 0002 | XYZ | J420954 | FA23JOI | 4KJ32 | FD9 | 8LKJ56,M | REJECTED |
| 0003 | AAA | 4KJ3 | 4321KJ | U3JL | 4LJ2 | 54J7NM2 | APPROVED |
| | | | | . . . | | | |

MATCHES 180

FRAUD PREVENTION VIA DATABASE REFERENCING

TECHNICAL FIELD

This application generally relates to fraud prevention, and more particularly, to fraud prevention via database referencing.

BACKGROUND

A centralized database stores and maintains data in one single database (e.g., database server) at one location. This location is often a central computer, for example, a desktop central processing unit (CPU), a server CPU, or a mainframe computer. Information stored on a centralized database is typically accessible from multiple different points. Multiple users or client workstations can work simultaneously on the centralized database, for example, based on a client/server configuration. A centralized database is easy to manage, maintain, and control, especially for purposes of security because of its single location. Within a centralized database, data redundancy is minimized as a single storing place of all data also implies that a given set of data only has one primary record.

However, a centralized database suffers from significant drawbacks. For example, a centralized database has a single point of failure. In particular, if there are no fault-tolerance considerations and a hardware failure occurs (for example a hardware, firmware, and/or a software failure), all data within the database is lost and work of all users is interrupted. In addition, centralized databases are highly dependent on network connectivity. As a result, the slower the connection, the amount of time needed for each database access is increased. Another drawback is the occurrence of bottlenecks when a centralized database experiences high traffic due to a single location. Furthermore, a centralized database provides limited access to data because only one copy of the data is maintained by the database. As a result, multiple devices cannot access the same piece of data at the same time without creating significant problems or risk overwriting stored data. Furthermore, because a database storage system has minimal to no data redundancy, data that is unexpectedly lost is very difficult to retrieve other than through manual operation from back-up storage.

Conventionally, a centralized database is limited by its ability to prevent fraudulent claims made by entities attempting to submit multiple claims for a single occurrence. As such, what is needed is a solution to overcome these significant drawbacks.

SUMMARY

One example embodiment may provide a method that includes one or more of receiving an entry intended for a database, identifying a plurality of data fields associated with the entry, identifying a plurality of data fields associated with one or more previously committed entries, adding the entry to the database with a temporary status, determining whether one or more of the plurality of data fields associated with the entry match one or more of the plurality of data fields associated with the one or more previously committed entries, and responsive to determining whether the match occurred, determining whether to commit the entry to the database and a status to assign the entry.

Another example embodiment may include a system that includes a client node configured to perform one or more of transmit an entry to a database, a computing node configured to receive the entry intended for a database, identify a plurality of data fields associated with the entry, identify a plurality of data fields associated with one or more previously committed entries, add the entry to the database with a temporary status, determine whether one or more of the plurality of data fields associated with the entry match one or more of the plurality of data fields associated with the one or more previously committed entries, and responsive to a determination as to whether the match occurred, determine whether to commit the entry to the database and a status to assign the entry.

Yet another example embodiment includes a non-transitory computer readable storage medium configured to perform one or more of store instructions that when executed cause a processor to perform receiving an entry intended for a database, identifying a plurality of data fields associated with the entry, identifying a plurality of data fields associated with one or more previously committed entries, adding the entry to the database with a temporary status, determining whether one or more of the plurality of data fields associated with the entry match one or more of the plurality of data fields associated with the one or more previously committed entries, and responsive to determining whether the match occurred, determining whether to commit the entry to the database and a status to assign the entry.

BRIEF DESCRIPTION OF THE DRAWINGS

FIG. 1B illustrates a network diagram of fraud prevention of database entries operating with a database, according to example embodiments.

DETAILED DESCRIPTION

Figure 1A:
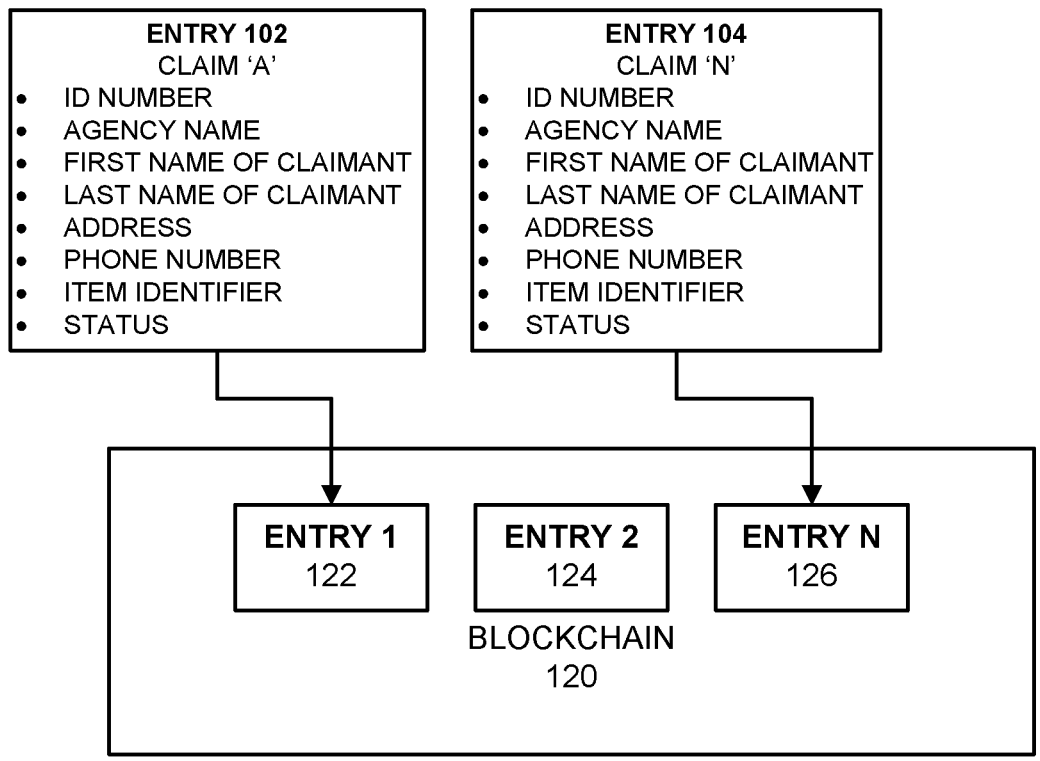
FIG. 1A illustrates a network diagram of a fraud prevention system including a database, according to example embodiments.

It will be readily understood that the instant components, as generally described and illustrated in the figures herein, may be arranged and designed in a wide variety of different configurations. Thus, the following detailed description of the embodiments of at least one of a method, apparatus, non-transitory computer readable medium and system, as represented in the attached figures, is not intended to limit the scope of the application as claimed but is merely representative of selected embodiments.

The instant features, structures, or characteristics as described throughout this specification may be combined in any suitable manner in one or more embodiments. For example, the usage of the phrases "example embodiments", "some embodiments", or other similar language, throughout this specification refers to the fact that a particular feature, structure, or characteristic described in connection with the embodiment may be included in at least one embodiment. Thus, appearances of the phrases "example embodiments", "in some embodiments", "in other embodiments", or other similar language, throughout this specification do not necessarily all refer to the same group of embodiments, and the described features, structures, or characteristics may be combined in any suitable manner in one or more embodiments.

In addition, while the term "message" may have been used in the description of embodiments, the application may be applied to many types of network data, such as, packet, frame, datagram, etc. The term "message" also includes packet, frame, datagram, and any equivalents thereof. Furthermore, while certain types of messages and signaling may be depicted in exemplary embodiments they are not limited to a certain type of message, and the application is not limited to a certain type of signaling.

Example embodiments provide methods, systems, components, non-transitory computer readable media, devices, and/or networks, which provide fraud prevention of received database entries. The claims received in the form of database entries have certain data fields and characteristics which may be cross-referenced with other entries to identify fraud and/or duplicate claims being submitted.

A decentralized database is a distributed storage system which includes multiple nodes that communicate with each other. A blockchain is an example of a decentralized database which includes an append-only immutable data structure resembling a distributed ledger capable of maintaining records between mutually untrusted parties. The untrusted parties are referred to herein as peers or peer nodes. Each peer maintains a copy of the database records and no single peer can modify the database records without a consensus being reached among the distributed peers. For example, the peers may execute a consensus protocol to validate blockchain storage entries, group the storage entries into blocks, and build a hash chain over the blocks. This process forms the ledger by ordering the storage entries, as is necessary, for consistency. In a public or permission-less blockchain, anyone can participate without a specific identity. Public blockchains often involve native cryptocurrency and use consensus based on various protocols such as Proof of Work (PoW). On the other hand, a permissioned blockchain database provides a system which can secure inter-actions among a group of entities which share a common goal but which do not fully trust one another, such as businesses that exchange funds, goods, information, and the like.

A blockchain operates arbitrary, programmable logic, tailored to a decentralized storage scheme and referred to as "smart contracts" or "chaincodes." In some cases, specialized chaincodes may exist for management functions and parameters which are referred to as system chaincode. Smart contracts are trusted distributed applications which leverage tamper-proof properties of the blockchain database and an underlying agreement between nodes which is referred to as an endorsement or endorsement policy. In general, blockchain entries typically must be "endorsed" before being committed to the blockchain while entries which are not endorsed are disregarded. A typical endorsement policy allows chaincode to specify endorsers for an entry in the form of a set of peer nodes that are necessary for endorsement. When a client sends the entry to the peers specified in the endorsement policy, the entry is executed to validate the entry. After validation, the entries enter an ordering phase in which a consensus protocol is used to produce an ordered sequence of endorsed entries grouped into blocks.

Nodes are the communication entities of the blockchain system. A "node" may perform a logical function in the sense that multiple nodes of different types can run on the same physical server. Nodes are grouped in trust domains and are associated with logical entities that control them in various ways. Nodes may include different types, such as a client or submitting-client node which submits an entry-invocation to an endorser (e.g., peer), and broadcasts entry-proposals to an ordering service (e.g., ordering node). Another type of node is a peer node which can receive client submitted entries, commit the entries and maintain a state and a copy of the ledger of blockchain entries. Peers can also have the role of an endorser, although it is not a requirement. An ordering-service-node or orderer is a node running the communication service for all nodes, and which implements a delivery guarantee, such as a broadcast to each of the peer nodes in the system when committing entries and modifying a world state of the blockchain, which is another name for the initial blockchain entry which normally includes control and setup information.

A ledger is a sequenced, tamper-resistant record of all state transitions of a blockchain. State transitions may result from chaincode invocations (i.e., entries) submitted by participating parties (e.g., client nodes, ordering nodes, endorser nodes, peer nodes, etc.). An entry may result in a set of asset key-value pairs being committed to the ledger as one or more operands, such as creates, updates, deletes, and the like. The ledger includes a blockchain (also referred to as a chain) which is used to store an immutable, sequenced record in blocks. The ledger also includes a state database which maintains a current state of the blockchain. There is typically one ledger per channel. Each peer node maintains a copy of the ledger for each channel of which they are a member.

A chain is an entry log which is structured as hash-linked blocks, and each block contains a sequence of N entries where N is equal to or greater than one. The block header includes a hash of the block's entries, as well as a hash of the prior block's header. In this way, all entries on the ledger may be sequenced and cryptographically linked together. Accordingly, it is not possible to tamper with the ledger data without breaking the hash links. A hash of a most recently added blockchain block represents every entry on the chain that has come before it, making it possible to ensure that all peer nodes are in a consistent and trusted state. The chain may be stored on a peer node file system (i.e., local, attached storage, cloud, etc.), efficiently supporting the append-only nature of the blockchain workload.

The current state of the immutable ledger represents the latest values for all keys that are included in the chain entry log. Because the current state represents the latest key values known to a channel, it is sometimes referred to as a world state. Chaincode invocations execute entries against the current state data of the ledger. To make these chaincode interactions efficient, the latest values of the keys may be stored in a state database. The state database may be simply an indexed view into the chain's entry log, it can therefore be regenerated from the chain at any time. The state database may automatically be recovered (or generated if needed) upon peer node startup, and before entries are accepted.

Blockchain is different from a traditional database in that blockchain is not a central storage but rather a decentralized, immutable, and secure storage, where nodes must share in changes to records in the storage. Some properties that are inherent in blockchain and which help implement the blockchain include, but are not limited to, an immutable ledger, smart contracts, security, privacy, decentralization, consensus, endorsement, accessibility, and the like, which are further described herein.

Example embodiments provide a way for insurance companies to manage fraudulent claims. Each insurance company is known to share a "black list" of untrustworthy companies and individuals, however, when an insured party changes insurance companies and provides slight changes to claim information, the black list may not be enough to limit those fraudulent claims. By analyzing statistical values of each small unit of information, any slight change will not be overlooked and those minor data entries and parameters can yield accurate results when attempting to screen fraudulent parties. Also, each information is encrypted so there will be no security issues of private information leaks.

The blockchain provides a way for claim information to be controlled by each insurance company, and thus in a "decentralized" manner. Each insurance company may want to limit the exposure of private information, and therefore the blockchain and its immutability can limit the exposure. A smart contract may be used to provide fraud detection. Also, if fraud is detected, the necessary information can be shared among insurance companies based on a "consensus" approach associated with the blockchain. Such an approach could not be implemented on a traditional centralized database. Although, each insurance company has its own independent information system, then it is not practical to assume that this blockchain-based approach could be implemented on a centralized system, since the consensus mechanism of the blockchain is used to share information when fraud is detected.

FIG. 1A illustrates a logic network diagram of identifying and preventing fraud in a database via a blockchain according to example embodiments. Referring to FIG. 1A, the network 100 includes a blockchain 120 with various entries 122, 124 . . . 126, received, processed and committed in the immutable ledger aspect of the blockchain. An entry 102, for example, may be sent as a claim for an insurance request to be recognized by an insurer or other third party. The claims have various information fields, such as an ID number assigned to the entry, an agency name of organizations which are interested parties, a first and last name of the party submitting the claim from their computing device, an address, phone number and similar information further identifying the claim submitting entity. Other fields include an item identifier which identifies the car, house, etc., which is subject to the insurance contract, and a current status of the claim, which is dynamically updated according to the cross-reference on information of all claims identified by the system. As additional claims are received as new entries to the database, such as, entry 104, the information is logged as a new entry field, or, in this example, a row of the database as illustrated in FIG. 1B.

FIG. 1B illustrates another logic network diagram 150 of the database according to example embodiments. Referring to FIG. 1B, the database structure includes the entries 160 as rows in a table. The parameters include the claim ID 162 assigned when the claim entry is received, an agency name 164 to identify at least one party responsible for the claim decision, a first name 166 and a last name 168 of the party submitting the claim, the address 172 and phone number 174 of the part submitting the claim, the item ID 176, which identifies the item associated with the claim (e.g., car, house, etc.), and the current status 178. Between the different claim entries, the fields that match from one claim to the next are identified for all fields regardless of the field type. In general, certain fields matching are not likely to trigger a fraud alert, such as agency, since many persons have the same agency, however, trigger criteria may include a common name, phone number, address, item ID, which are received within a particular time window (e.g., 30 days). Different members of the same address may have different names but may attempt to submit a claim more than one for a common item. Such attempts must be flagged and denied/rejected pending further information.

The matches 180 are identified periodically, such as once every minute, 10 minutes, etc., and the preliminary status assigned to any matching claim entry is a rejection. Also, as new claims arrive they may be set to a temporary status, such as pending or awaiting update, prior to attempting to finalize the status and commit the claim to the blockchain as a recognized and/or accepted claim. Claims which are denied may also be committed the blockchain regardless of the status so that a record of those entries can be maintained for future audit purposes. The temporary status of a claim entry may be forwarded to a temporary database outside the blockchain so the blockchain is not used to write the entry prior to a final disposition of the claim status.

In general, all the received claim information will be shared throughout an organization's network on the blockchain as peers. Initially, the state of a claim is "received" or "pending", and when the claim is approved or declined the ledger will be updated. The received claims will be pending in a temporary database which is not part of the committed entries on the blockchain. To assure privacy, the private information with regard to a fraud detection policy used to identify whether a claim should be flagged will be irreversibly encrypted before writing to the ledger on the blockchain. With the encryption, there is no security risk since other organization can read the private information of the claims. When a claim is received by the intended organization, in order to check whether there is a similar claim in the ledger of the blockchain previously submitted, the claim's private information will be compared by the encrypted state. If the ratio of private information matches is above the given criteria for the past claim (e.g., 7 out of 8 data fields are unique), it is considered to be a relevant claim. For the relevant claim, initially, the state (e.g. received, approved, rejected) is investigated. If the non-approved state, (not approved) number is above the given criteria, an alert is raised. Next, the number of past relevant claims which are above the given criteria threshold (e.g., more than one) the alert is raised and sent to the registered authority. Upon the alert being received, the organization can request that the actual decrypted relevant data from the organization's blockchain. By this request, all blockchain peers will need to reach a consensus for the subject and target insurance companies to share the actual data. If the consensus is reached, the data is successfully shared between both parties by a reversible encryption (e.g., public key encryption) from the target organization's private ledger.

One example procedure may include input, such as an insurance claim entry. The fraud detection policy may be part of a smart contract that requires certain key fields (e.g., first name, last name, address, phone number, insured goods, etc.) be compared to other claims received. When the alert is needed, certain peers may be alerted and requested to provide consensus feedback regarding the particular event, the information identified as suspicious during the audit may be sent as part of the alert (e.g., name, item ID, etc.) then the peers may be required to reach a consensus among the peers as to whether the claim is accepted or rejected.

Figure 2A:
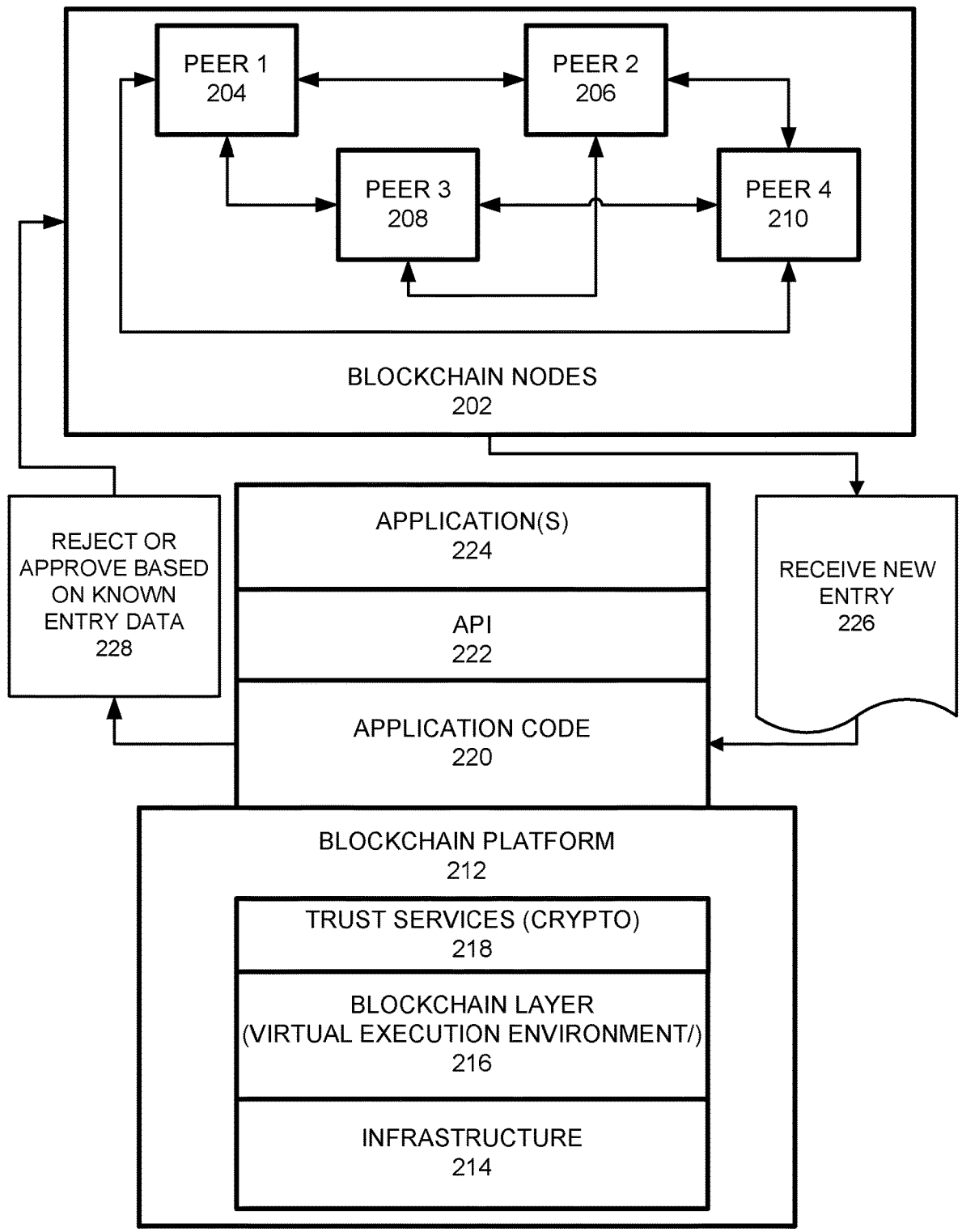
FIG. 2A illustrates an example peer node configuration, according to example embodiments.

FIG. 2A illustrates a blockchain architecture configuration 200, according to example embodiments. Referring to FIG. 2A, the blockchain architecture 200 may include certain blockchain elements, for example, a group of blockchain nodes 202. The blockchain nodes 202 may include one or more nodes 204-210 (these four nodes are depicted by example only). These nodes participate in a number of activities, such as blockchain entry addition and validation process (consensus). One or more of the blockchain nodes 204-210 may endorse entries based on endorsement policy and may provide an ordering service for all blockchain nodes in the architecture 200. A blockchain node may initiate a blockchain authentication and seek to write to a blockchain immutable ledger stored in blockchain layer 216, a copy of which may also be stored on the underpinning physical infrastructure 214. The blockchain configuration may include one or more applications 224 which are linked to application programming interfaces (APIs) 222 to access and execute stored program/application code 220 (e.g., chaincode, smart contracts, etc.) which can be created according to a customized configuration sought by participants and can maintain their own state, control their own assets, and receive external information. This can be deployed as an entry and installed, via appending to the distributed ledger, on all blockchain nodes 204-210.

The blockchain base or platform 212 may include various layers of blockchain data, services (e.g., cryptographic trust services, virtual execution environment, etc.), and underpinning physical computer infrastructure that may be used to receive and store new entries and provide access to auditors which are seeking to access data entries. The blockchain layer 216 may expose an interface that provides access to the virtual execution environment necessary to process the program code and engage the physical infrastructure 214. Cryptographic trust services 218 may be used to verify entries such as asset exchange entries and keep information private.

The blockchain architecture configuration of FIG. 2A may process and execute program/application code 220 via one or more interfaces exposed, and services provided, by blockchain platform 212. The code 220 may control blockchain assets. For example, the code 220 can store and transfer data, and may be executed by nodes 204-210 in the form of a smart contract and associated chaincode with conditions or other code elements subject to its execution. As a non-limiting example, smart contracts may be created to execute reminders, updates, and/or other notifications subject to the changes, updates, etc. The smart contracts can themselves be used to identify rules associated with authorization and access requirements and usage of the ledger. For example, the information may include a new entry claim 226, which may be processed by one or more processing entities (e.g., virtual machines) included in the blockchain layer 216. The result 228 may include a decision to reject or approve the claim based on the criteria defined in the smart contract and/or a consensus of the peers. The physical infrastructure 214 may be utilized to retrieve any of the data or information described herein.

Within chaincode, a smart contract may be created via a high-level application and programming language, and then written to a block in the blockchain. The smart contract may include executable code which is registered, stored, and/or replicated with a blockchain (e.g., distributed network of blockchain peers). An entry is an execution of the smart contract code which can be performed in response to conditions associated with the smart contract being satisfied. The executing of the smart contract may trigger a trusted modification(s) to a state of a digital blockchain ledger. The modification(s) to the blockchain ledger caused by the smart contract execution may be automatically replicated throughout the distributed network of blockchain peers through one or more consensus protocols.

The smart contract may write data to the blockchain in the format of key-value pairs. Furthermore, the smart contract code can read the values stored in a blockchain and use them in application operations. The smart contract code can write the output of various logic operations into the blockchain. The code may be used to create a temporary data structure in a virtual machine or other computing platform. Data written to the blockchain can be public and/or can be encrypted and maintained as private. The temporary data that is used/generated by the smart contract is held in memory by the supplied execution environment, then deleted once the data needed for the blockchain is identified.

A chaincode may include the code interpretation of a smart contract, with additional features. As described herein, the chaincode may be program code deployed on a computing network, where it is executed and validated by chain validators together during a consensus process. The chaincode receives a hash and retrieves from the blockchain a hash associated with the data template created by use of a previously stored feature extractor. If the hashes of the hash identifier and the hash created from the stored identifier template data match, then the chaincode sends an authorization key to the requested service. The chaincode may write to the blockchain data associated with the cryptographic details.

Figure 2B:
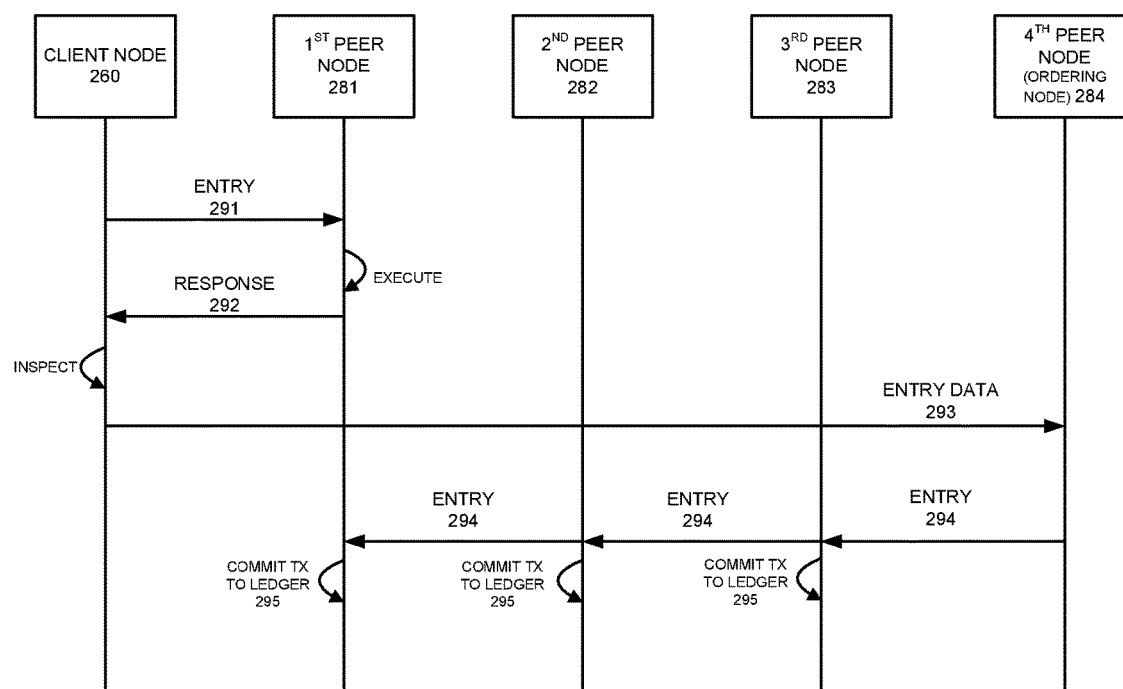
FIG. 2B illustrates a further peer node configuration, according to example embodiments.

FIG. 2B illustrates an example of a flow 250 between nodes of the blockchain in accordance with an example embodiment. Referring to FIG. 2B, the entry flow may include an entry proposal 291 sent by an application client node 260 to an endorsing peer node 281. The endorsing peer 281 may verify the client signature and execute a chaincode function to initiate the entry. The output may include the chaincode results, a set of key/value versions that were read in the chaincode (read set), and the set of keys/values that were written in chaincode (write set). The proposal response 292 is sent back to the client 260 along with an endorsement signature, if approved. The client 260 assembles the endorsements into an entry payload 293 and broadcasts it to an ordering service node 284. The ordering service node 284 then delivers ordered entries as blocks to all peers 281-283 on a channel. Before committal to the blockchain, each peer 281-283 may validate the entry. For example, the peers may check the endorsement policy to ensure that the correct allotment of the specified peers have signed the results and authenticated the signatures against the entry payload 293.

Referring again to FIG. 2B, the client node 260 initiates the entry 291 by constructing and sending a request to the peer node 281, which is an endorser. The client 260 may include an application leveraging a supported software development kit (SDK), such as NODE, JAVA, PYTHON, and the like, which utilizes an available API to generate an entry proposal. The proposal is a request to invoke a chaincode function so that data can be read and/or written to the ledger (i.e., write new key value pairs for the assets). The SDK may serve as a shim to package the entry proposal into a properly architected format (e.g., protocol buffer over a remote procedure call (RPC)) and take the client's cryptographic credentials to produce a unique signature for the entry proposal.

In response, the endorsing peer node 281 may verify (a) that the entry proposal is well formed, (b) the entry has not been submitted already in the past (replay-attack protection), (c) the signature is valid, and (d) that the submitter (client 260, in the example) is properly authorized to perform the proposed operation on that channel. The endorsing peer node 281 may take the entry proposal inputs as arguments to the invoked chaincode function. The chaincode is then executed against a current state database to produce entry results including a response value, read set, and write set. However, no updates are made to the ledger at this point. In 292, the set of values, along with the endorsing peer node's 281 signature is passed back as a proposal response 292 to the SDK of the client 260 which parses the payload for the application to consume.

In response, the application of the client 260 inspects/verifies the endorsing peers signatures and compares the proposal responses to determine if the proposal response is the same. If the chaincode only queried the ledger, the application would inspect the query response and would typically not submit the entry to the ordering node service 284. If the client application intends to submit the entry to the ordering node service 284 to update the ledger, the application determines if the specified endorsement policy has been fulfilled before submitting (i.e., did all peer nodes necessary for the entry endorse the entry). Here, the client may include only one of multiple parties to the entry. In this case, each client may have their own endorsing node, and each endorsing node will need to endorse the entry. The architecture is such that even if an application selects not to inspect responses or otherwise forwards an unendorsed entry, the endorsement policy will still be enforced by peers and upheld at the commit validation phase.

After successful inspection, in step 293 the client 260 assembles endorsements into an entry and broadcasts the entry proposal and response within an entry message to the ordering node 284. The entry may contain the read/write sets, the endorsing peers signatures and a channel ID. The ordering node 284 does not need to inspect the entire content of an entry in order to perform its operation, instead the ordering node 284 may simply receive entries from all channels in the network, order them chronologically by channel, and create blocks of entries per channel.

The blocks of the entry are delivered from the ordering node 284 to all peer nodes 281-283 on the channel. The entries 294 within the block are validated to ensure any endorsement policy is fulfilled and to ensure that there have been no changes to ledger state for read set variables since the read set was generated by the entry execution. Entries in the block are tagged as being valid or invalid. Furthermore, in step 295 each peer node 281-283 appends the block to the channel's chain, and for each valid entry the write sets are committed to current state database. An event is emitted, to notify the client application that the entry (invocation) has been immutably appended to the chain, as well as to notify whether the entry was validated or invalidated.

Figure 3:
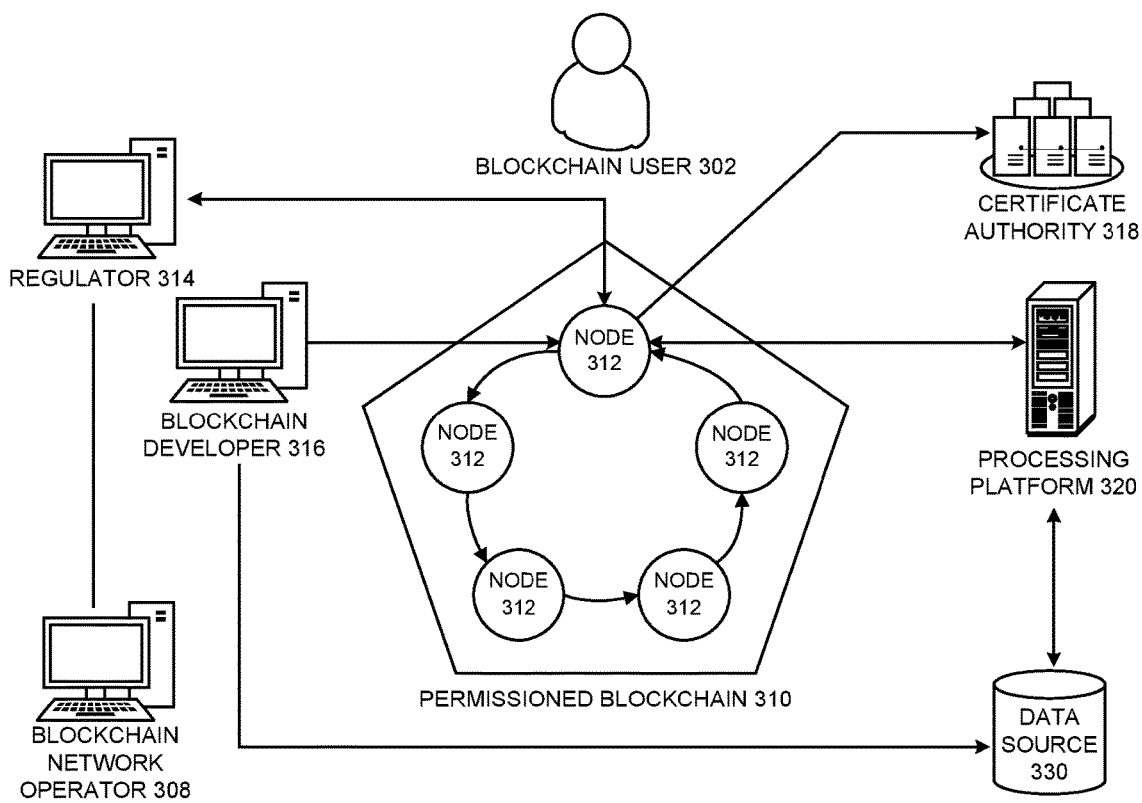
FIG. 3 illustrates a permissioned network, according to example embodiments.

FIG. 3 illustrates an example of a permissioned blockchain network 300, which features a distributed, decentralized peer-to-peer architecture, and a certificate authority 318 managing user roles and permissions. In this example, the blockchain user 302 may submit an entry to the permissioned blockchain network 310. In this example, the entry can be a deploy, invoke or query, and may be issued through a client-side application leveraging an SDK, directly through a REST API, or the like. Trusted business networks may provide access to regulator systems 314, such as auditors (the Securities and Exchange Commission in a U.S. equities market, for example). Meanwhile, a blockchain network operator system of nodes 308 manage member permissions, such as enrolling the regulator system 310 as an "auditor" and the blockchain user 302 as a "client." An auditor could be restricted only to querying the ledger whereas a client could be authorized to deploy, invoke, and query certain types of chaincode.

A blockchain developer system 316 writes chaincode and client-side applications. The blockchain developer system 316 can deploy chaincode directly to the network through a REST interface. To include credentials from a traditional data source 330 in chaincode, the developer system 316 could use an out-of-band connection to access the data. In this example, the blockchain user 302 connects to the network through a peer node 312. Before proceeding with any entries, the peer node 312 retrieves the user's enrollment and entry certificates from the certificate authority 318. In some cases, blockchain users must possess these digital certificates in order to transact on the permissioned blockchain network 310. Meanwhile, a user attempting to drive chaincode may be required to verify their credentials on the traditional data source 330. To confirm the user's authorization, chaincode can use an out-of-band connection to this data through a traditional processing platform 320.

Figure 4:
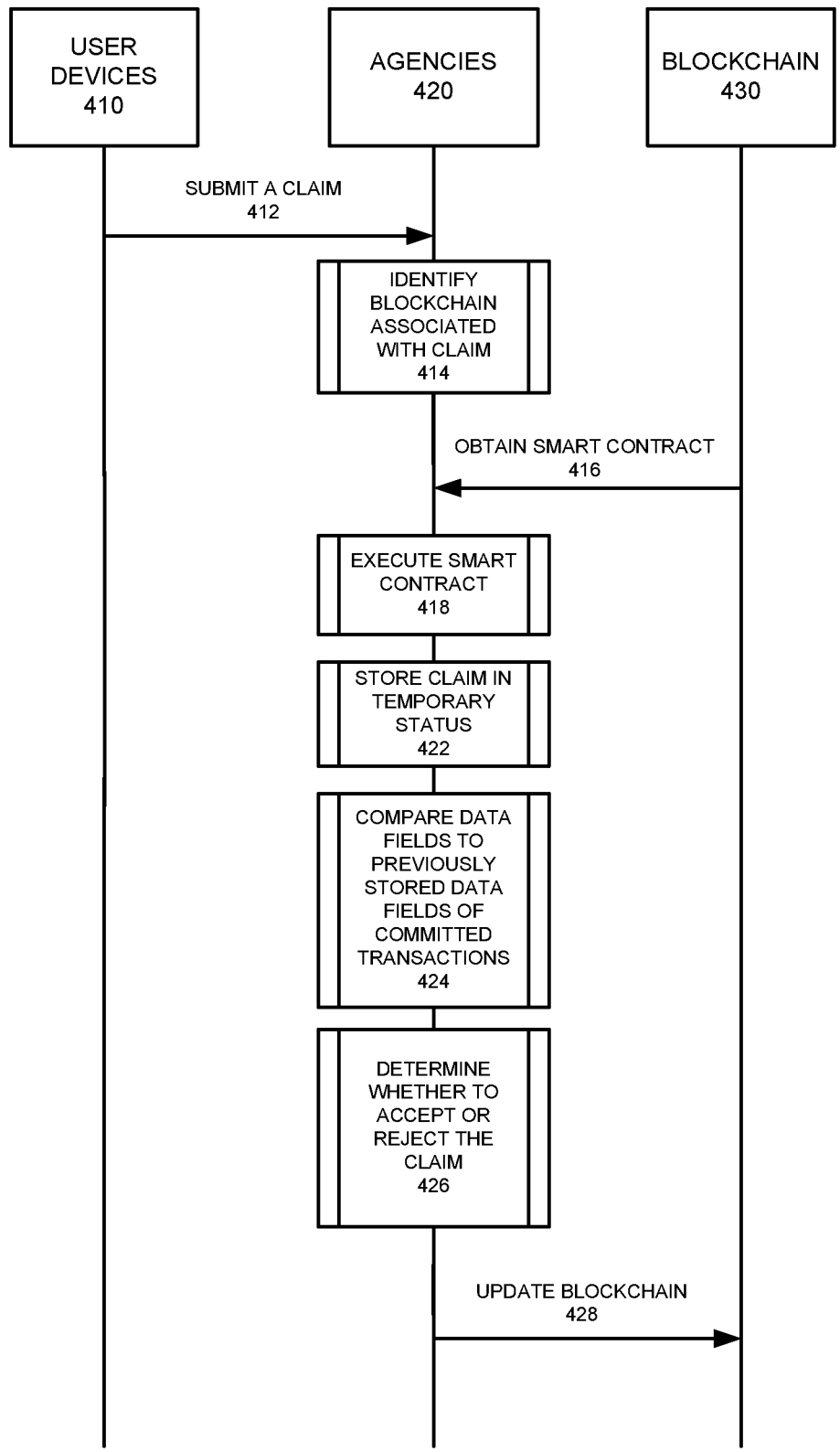
FIG. 4 illustrates a system messaging diagram of a fraud management configuration, according to example embodiments.

FIG. 4 illustrates a system messaging diagram for performing fraud management in a database, according to example embodiments. Referring to FIG. 4, the system diagram 400 includes various end users and their devices 410 which represent the parties submitting claims. Agencies 420, which include computer networks for receiving the claims and the blockchain 430 where the claims are committed. The user devices 410 may submit a claim 412 to one or more agencies 420 for review. The agency may identify 414 the blockchain 430 and retrieve any smart contract 416 created to manage such data entries. The smart contract is executed 418 and the claim is stored as part of a temporary storage operation to maintain a temporary status 422. Certain data fields of the new claim and previous claims are compared according to comparison criteria 424, which also may score the relevancy and provide a designation for the claims, such as rejected or accepted. Based on the comparison operation, the claim may be accepted or rejected 426 and sent 428 to the blockchain so it can be updated accordingly.

Figure 5A:
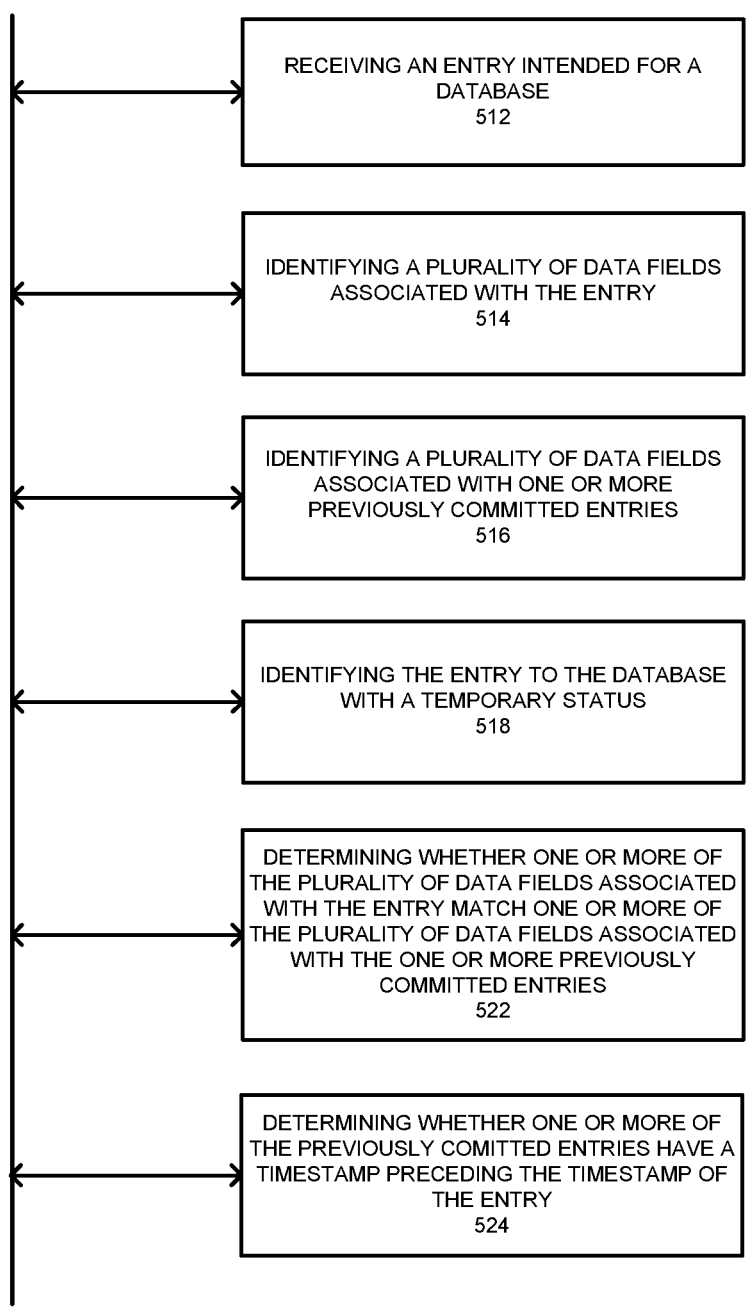
FIG. 5A illustrates a flow diagram of a fraud management configuration, according to example embodiments.

FIG. 5A illustrates a flow diagram 500 of an example method of fraud management in a blockchain, according to example embodiments. Referring to FIG. 5A, the method 500 may include receiving an entry intended for a database 512, identifying a plurality of data fields associated with the entry 514, identifying a plurality of data fields associated with one or more previously committed entries 516, adding the entry to the database with a temporary status 518, determining whether one or more of the plurality of data fields associated with the entry match one or more of the plurality of data fields associated with the one or more previously committed entries 522, responsive to determining whether the match occurred, determining whether to commit the entry to the database and a status to assign the entry 524.

The method may also include committing the entry to the database, and assigning the entry a rejected status when one or more of the plurality of data fields associated with the data entry match one or more of the plurality of data fields associated with the previously committed entries. The method may also include committing the entry to the database, and assigning the entry an accepted status when none of the plurality of data fields associated with the data entry match any of the plurality of data fields associated with the previously committed entries. The database may include a temporary data storage and/or a blockchain. When adding the entry to the database with a temporary status, the entry is added to a temporary storage location and when the entry is rejected the entry is committed to the blockchain with a rejected status. Another operation may include executing a smart contract with instructions on whether to accept or reject the entry in the blockchain. The method may also include identifying whether a key data field among the plurality of data fields associated with the entry matches a key data field among the plurality of data fields associated with the one or more previously committed entries, and responsive to determining that the key data field match occurred, rejecting the entry.

Figure 5B:
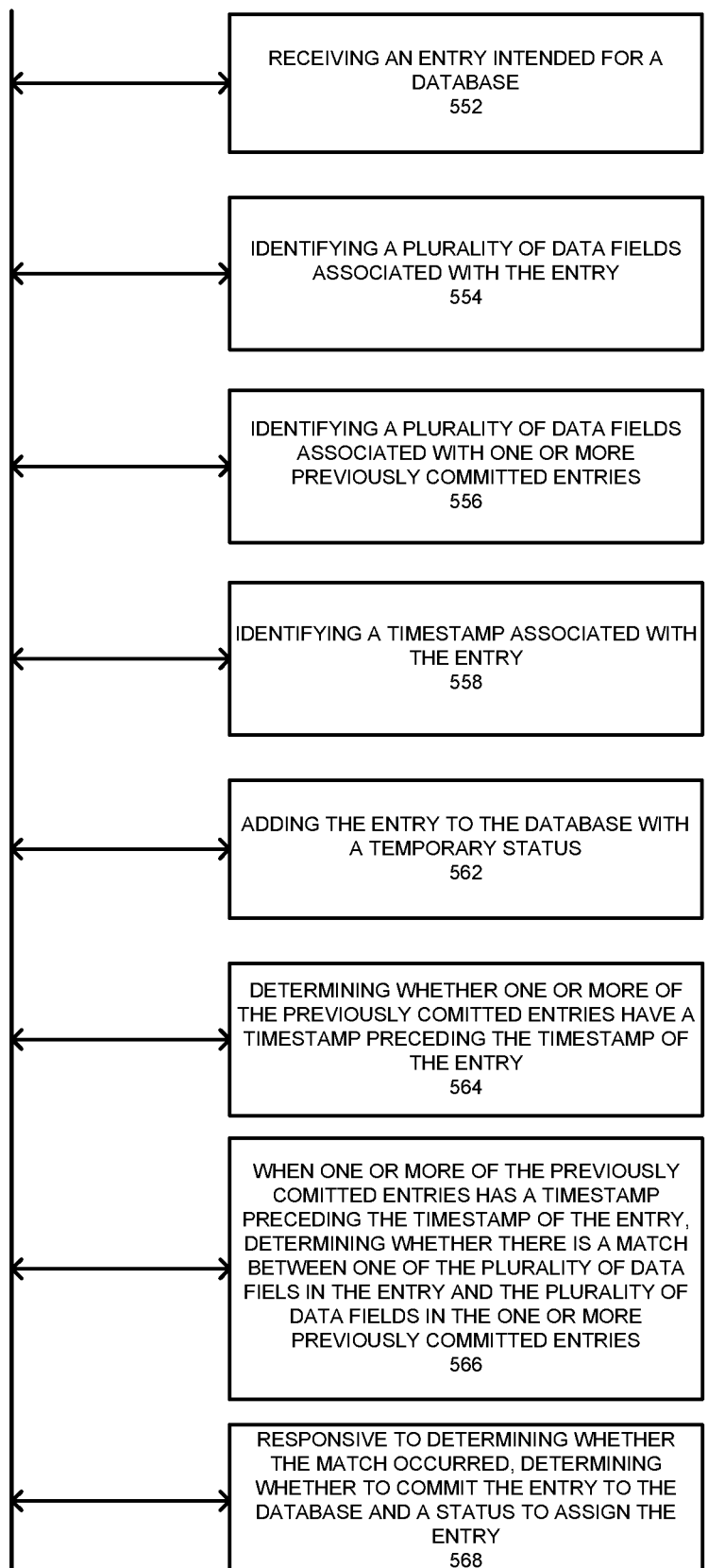
FIG. 5B illustrates a further flow diagram of a fraud management configuration, according to example embodiments.

FIG. 5B illustrates a flow diagram 550 of an example method of in a blockchain, according to example embodiments. The method may include receiving an entry intended for a database 552, identifying a plurality of data fields associated with the entry 554, identifying a plurality of data fields associated with one or more previously committed entries 556, identifying a timestamp associated with the entry 558, adding the entry to the database with a temporary status 562, determining whether one or more of the previously committed entries have a timestamp preceding the time stamp of the entry 564, and when one or more of the previously committed entries has a timestamp preceding the time stamp of the entry, determining whether there is a match between one of the plurality of data fields in the entry and the plurality of data fields in the one or more previously committed entries 566, and responsive to determining whether the match occurred, determining whether to commit the entry to the database and a status to assign the entry 568.

In addition to identifying data fields linked to a particular claim, the claim information and corresponding entry received may be identified by a timestamp. The time information can be identified and compared to previously submitted entries with earlier timestamps. When one or more fields match between the entry and previously submitted entries, then the likelihood of fraud is high and the entry can be rejected pending further auditing operations to determine whether the entry is linked to fraud or is a legitimate claim.

Figure 5C:
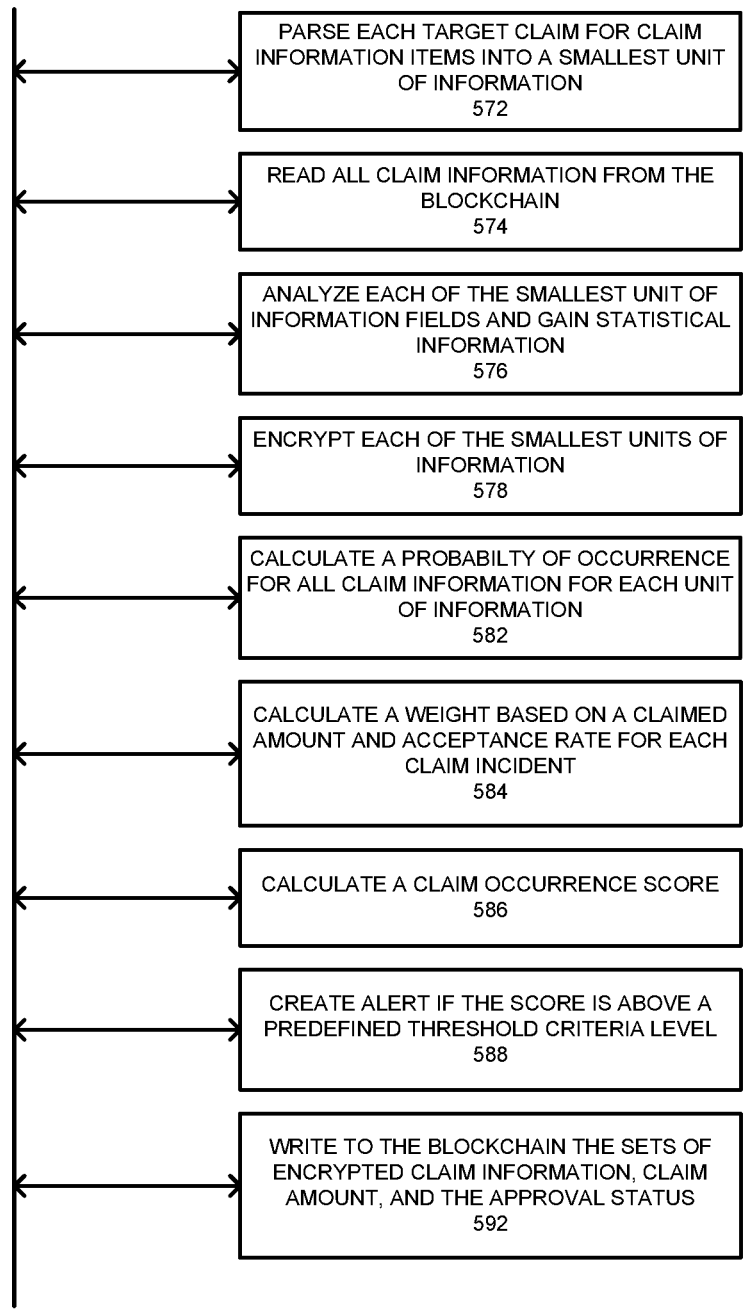
FIG. 5C illustrates yet another flow diagram of a fraud management configuration, according to example embodiments.

FIG. 5C illustrates yet another flow diagram of a fraud management configuration, according to example embodiments. Referring to FIG. 5C, the process 570 includes certain parameters, such as a target claim which includes several claim information items. The claim information items, which are required to fill the claim information, may include various parameters (e.g., name, address, state, country, phone number, claim type, claim information, etc.). A smallest unit of information may be the smallest meaningful unit, such as a "last name", "middle name" "first name", "street", etc. The statistical information may include a probability of occurrence, where common states have higher scores, such as "New York" is "20%" and Maine is "0.2%". Other claim information may include all claim information which includes each claim incident by sets of encrypted claim information items and a claimed amount, along with a status (i.e., received/rejected/approved). Further information may include an encrypted claim information item, such as the data of a claim information item which is encrypted in a way that a same value corresponds to the same encrypted value but the original data cannot be assumed from the encrypted value. Typical methods to achieve this encryption would be to encrypt using a public key. Other fields include a claim occurrence score, which is a score of the claim occurrence against the expected value (e.g., 1). For example, when the target claim includes data that is common to other claim information than the score is high, however, if the target claim information is normal then a score may be closer to the expected value.

Referring to FIG. 5C, the parser may parse each target claim for claim information items into smallest units of information 572. The blockchain reader module may read all claim information from the blockchain 574, and the statistical analyzer then analyzes 576 each general smallest unit of information to achieve statistical information. The smallest units of information can then be encrypted 578 and each "probability of occurrence" for all claim information for each unit of information is calculated 582. Also, a weight is calculated 584 based on each claim incident's claimed amount and acceptance rate. Based on the results, a claim occurrence score is calculated 586. An alert is created if the score obtained from statistic analyzer is above a certain criteria 588, and sets of encrypted claim information items are written to the blockchain along with the claim amount and the claim approval status 592. Examples of such information include an insurance company, a claim approval state, sets of encrypted claim information items and a claim amount.

One example for obtaining the "probability of occurrence" is to search through a database and divide target small units of information frequency by all frequency target small unit information including the target. For example, a frequency of "City of Tokyo" may yield five million hits/ "City of *" would yield 100 million hits, which would derive a value of 5%. A weight for a weighted amount can be set by comparing the average amount of a claim for a target. For example, by dividing an average claim amount for a target smallest unit of information by an average claim amount. A weight for "acceptance" can be set by comparing the average acceptance of a claim for a target. For example, by dividing an average acceptance rate for a target smallest unit of information by an average acceptance rate. In this example, the average score may be seven where an expected value is one. A critical value or threshold for an alert can be set, for example, to two which can also be derived by assuming the distribution of the score (e.g., standard distribution) and the percentage of the alert. In this case, a stronger alert value can be raised, so although, some small pieces of information may be different overall, it is statically abnormal that too many cases of claims have been approved for similar claim information taking the claim amount into consideration. Also, since the data is compared against the encrypted data, then the security will be preserved.

Figure 6A:
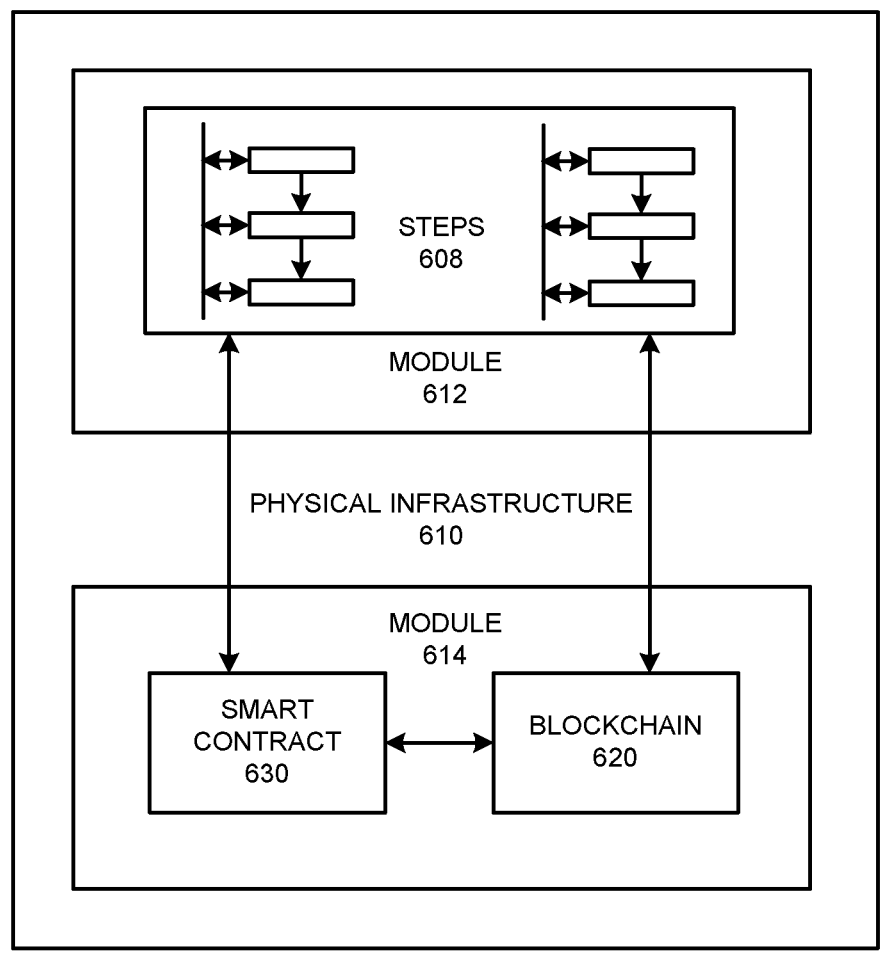
FIG. 6A illustrates an example system configured to perform one or more operations described herein, according to example embodiments.

FIG. 6A illustrates an example system 600 that includes a physical infrastructure 610 configured to perform various operations according to example embodiments. Referring to FIG. 6A, the physical infrastructure 610 includes a module 612 and a module 614. The module 614 includes a blockchain 620 and a smart contract 630 (which may reside on the blockchain 620), that may execute any of the operational steps 608 (in module 612) included in any of the example embodiments. The steps/operations 608 may include one or more of the embodiments described or depicted and may represent output or written information that is written or read from one or more smart contracts 630 and/or blockchains 620. The physical infrastructure 610, the module 612, and the module 614 may include one or more computers, servers, processors, memories, and/or wireless communication devices. Further, the module 612 and the module 614 may be a same module.

Figure 6B:
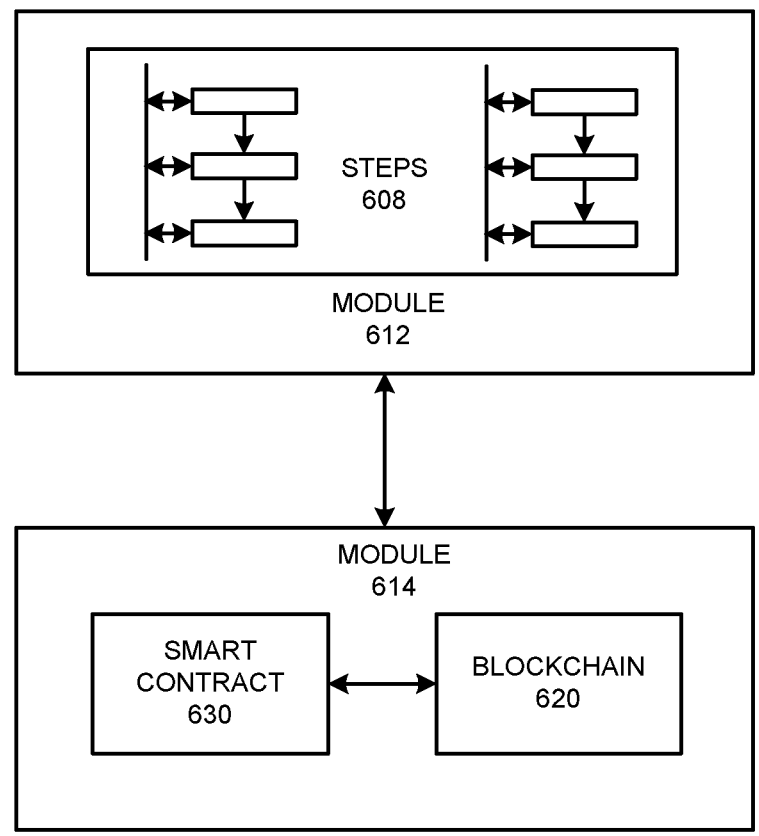
FIG. 6B illustrates a further example system configured to perform one or more operations described herein, according to example embodiments.

FIG. 6B illustrates an example system 640 configured to perform various operations according to example embodiments. Referring to FIG. 6B, the system 640 includes a module 612 and a module 614. The module 614 includes a blockchain 620 and a smart contract 630 (which may reside on the blockchain 620), that may execute any of the operational steps 608 (in module 612) included in any of the example embodiments. The steps/operations 608 may include one or more of the embodiments described or depicted and may represent output or written information that is written or read from one or more smart contracts 630 and/or blockchains 620. The physical infrastructure 610, the module 612, and the module 614 may include one or more computers, servers, processors, memories, and/or wireless communication devices. Further, the module 612 and the module 614 may be a same module.

Figure 6C:
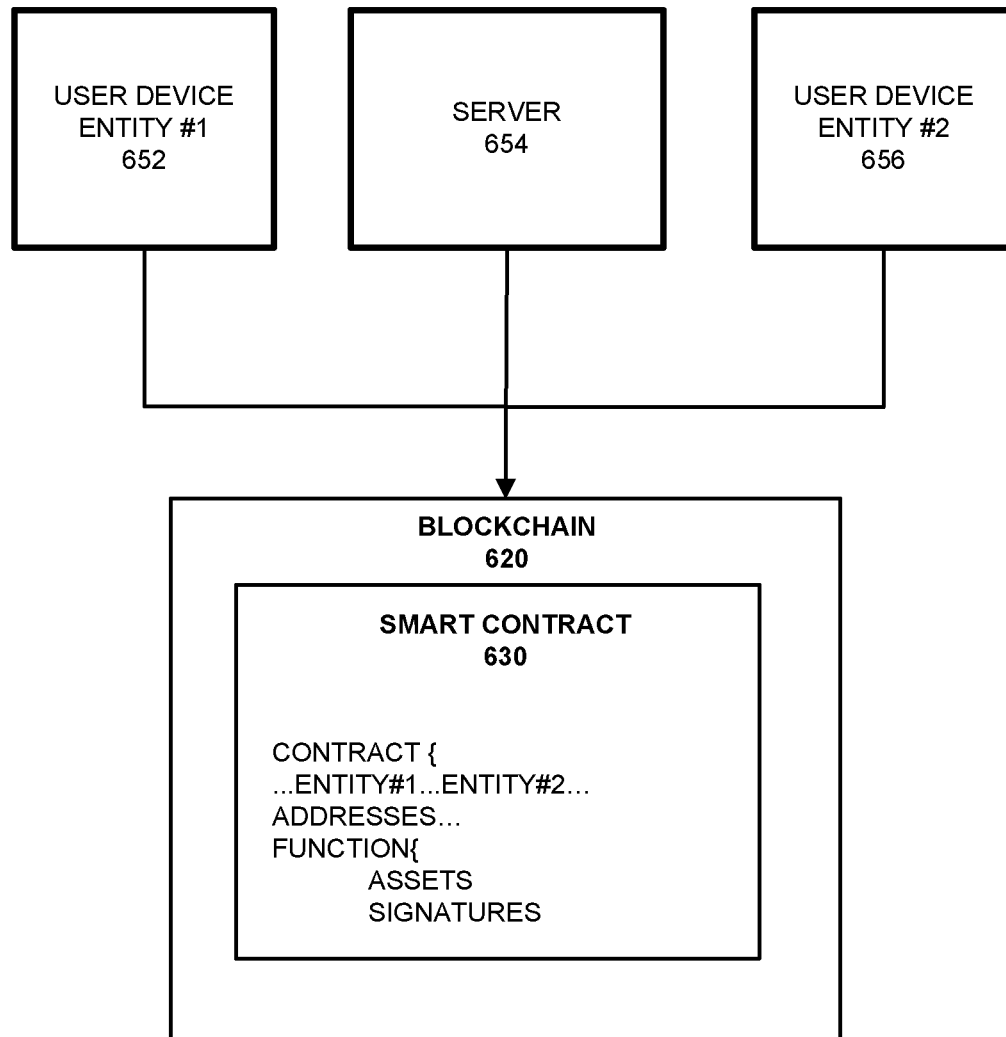
FIG. 6C illustrates a smart contract configuration among contracting parties and a mediating server configured to enforce the smart contract terms on the blockchain according to example embodiments.

FIG. 6C illustrates an example smart contract configuration among contracting parties and a mediating server configured to enforce the smart contract terms on the blockchain according to example embodiments. Referring to FIG. 6C, the configuration 650 may represent a communication session, an asset transfer session or a process or procedure that is driven by a smart contract 630 which explicitly identifies one or more user devices 652 and/or 656. The execution, operations and results of the smart contract execution may be managed by a server 654. Content of the smart contract 630 may require digital signatures by one or more of the entities 652 and 656 which are parties to the smart contract entry. The results of the smart contract execution may be written to a blockchain 620 as a blockchain entry. The smart contract 630 resides on the blockchain 620 which may reside on one or more computers, servers, processors, memories, and/or wireless communication devices.

Figure 6D:
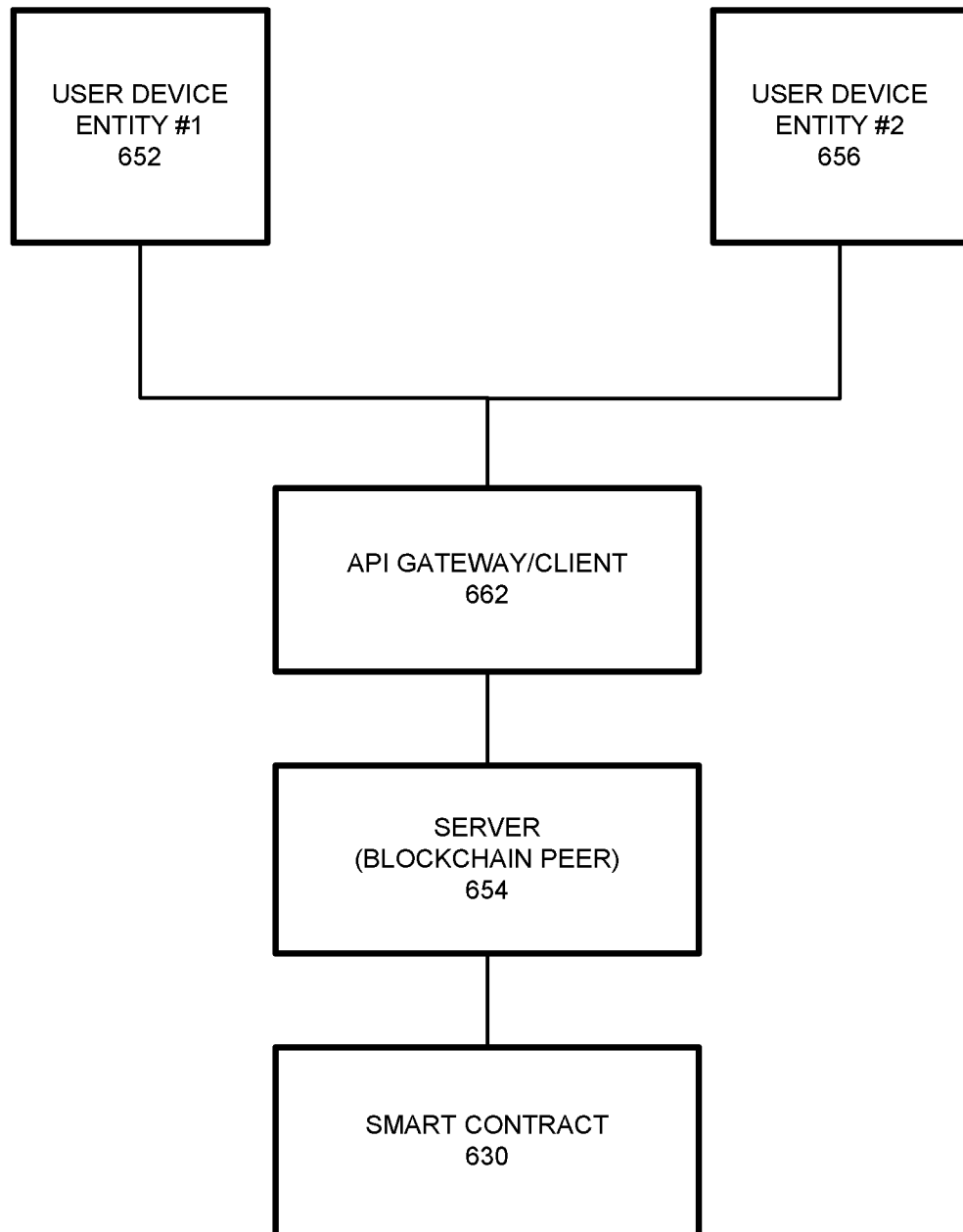
FIG. 6D illustrates another an additional example system, according to example embodiments.

FIG. 6D illustrates a common interface 660 for accessing logic and data of a blockchain, according to example embodiments. Referring to the example of FIG. 6D, an application programming interface (API) gateway 662 provides a common interface for accessing blockchain logic (e.g., smart contract 630 or other chaincode) and data (e.g., distributed ledger, etc.) In this example, the API gateway 662 is a common interface for performing entries (invoke, queries, etc.) on the blockchain by connecting one or more entities 652 and 656 to a blockchain peer (i.e., server 654). Here, the server 654 is a blockchain network peer component that holds a copy of the world state and a distributed ledger allowing clients 652 and 656 to query data on the world state as well as submit entries into the blockchain network where, depending on the smart contract 630 and endorsement policy, endorsing peers will run the smart contracts 630.

The above embodiments may be implemented in hardware, in a computer program executed by a processor, in firmware, or in a combination of the above. A computer program may be embodied on a computer readable medium, such as a storage medium. For example, a computer program may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

An exemplary storage medium may be coupled to the processor such that the processor may read information from, and write information to, the storage medium. In the alternative, the storage medium may be integral to the processor. The processor and the storage medium may reside in an application specific integrated circuit ("ASIC"). In the alternative, the processor and the storage medium may reside as discrete components. For example, FIG. 7 illustrates an example computer system architecture 700, which may represent or be integrated in any of the above-described components, etc.

Figure 7A:
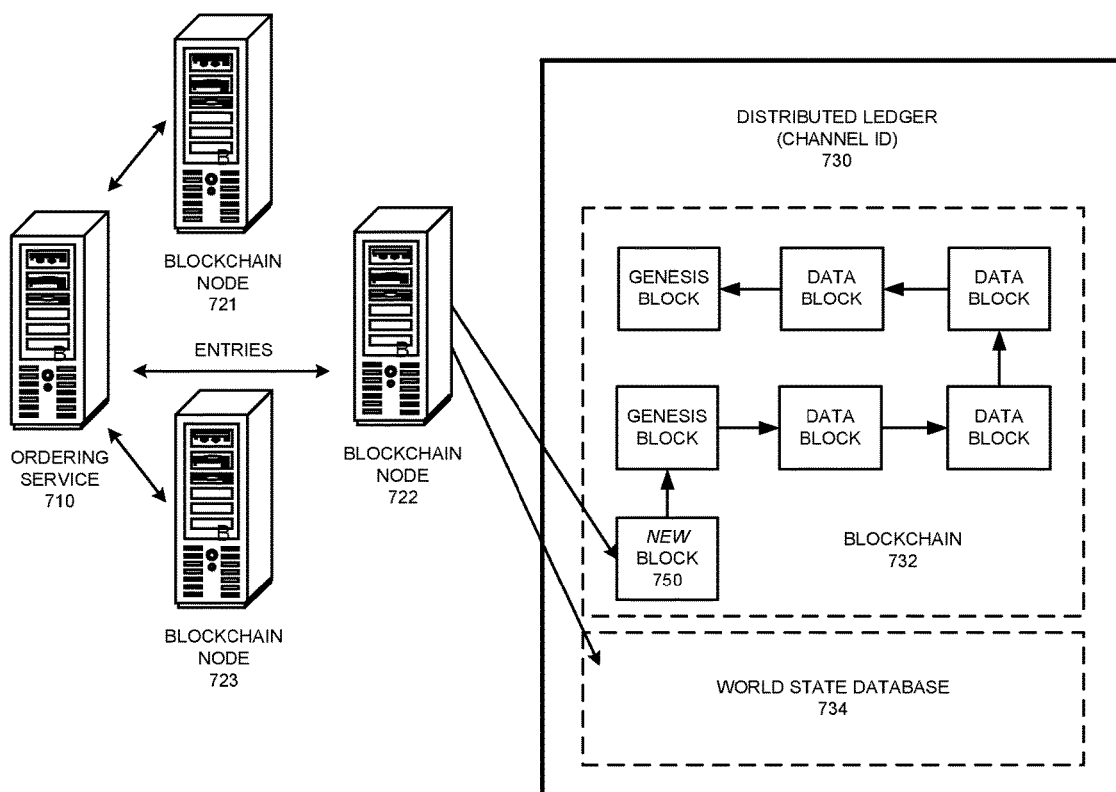
FIG. 7A illustrates a process of new data being added to a database, according to example embodiments.
Figure 7B:
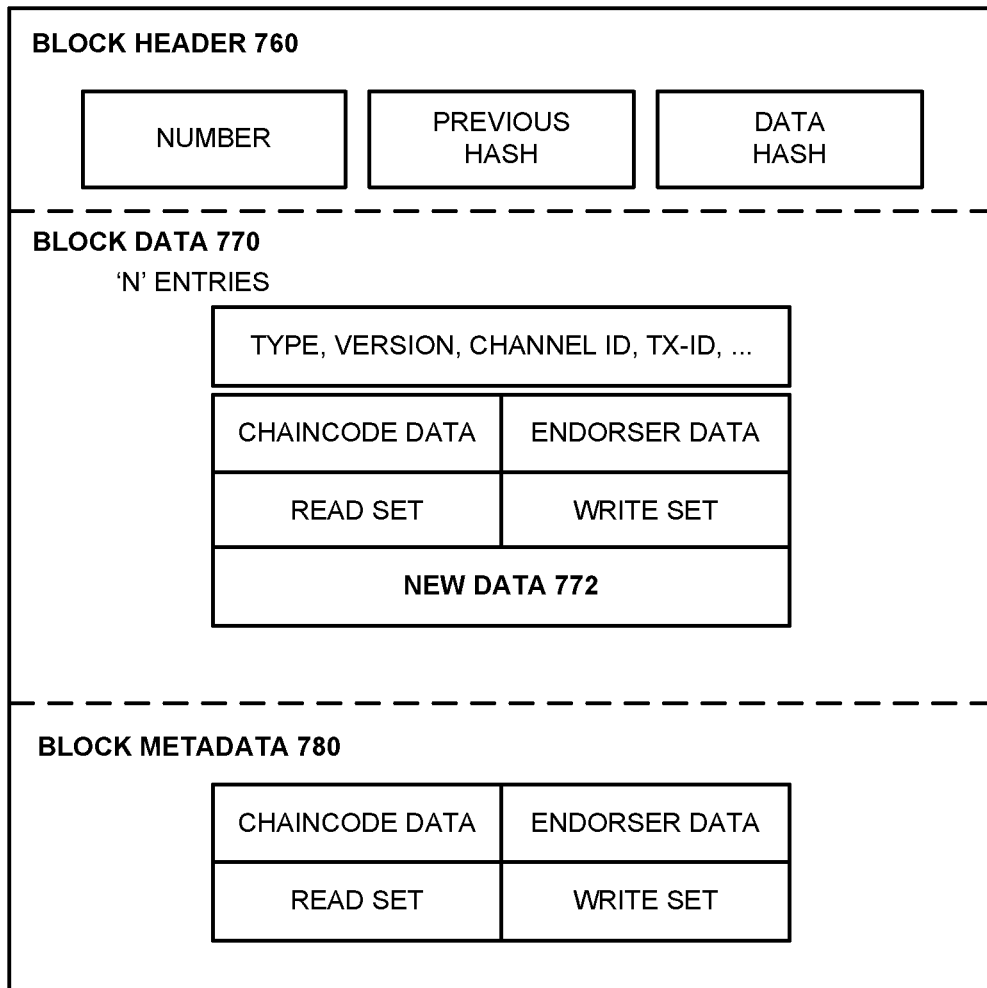
FIG. 7B illustrates contents a data block including the new data, according to example embodiments.

FIG. 7A illustrates a process 700 of a new block being added to a distributed ledger 730, according to example embodiments, and FIG. 7B illustrates contents of a block structure 750 for blockchain, according to example embodiments. Referring to FIG. 7A, clients (not shown) may submit entries to blockchain nodes 721, 722, and/or 723. Clients may be instructions received from any source to enact activity on the blockchain 730. As an example, clients may be applications that act on behalf of a requester, such as a device, person or entity to propose entries for the blockchain. The plurality of blockchain peers (e.g., blockchain nodes 721, 722, and 723) may maintain a state of the blockchain network and a copy of the distributed ledger 730. Different types of blockchain nodes/peers may be present in the blockchain network including endorsing peers which simulate and endorse entries proposed by clients and committing peers which verify endorsements, validate entries, and commit entries to the distributed ledger 730. In this example, the blockchain nodes 721, 722, and 723 may perform the role of endorser node, committer node, or both.

The distributed ledger 730 includes a blockchain 732 which stores immutable, sequenced records in blocks, and a state database 734 (current world state) maintaining a current state of the blockchain 732. One distributed ledger 730 may exist per channel and each peer maintains its own copy of the distributed ledger 730 for each channel of which they are a member. The blockchain 732 is an entry log, structured as hash-linked blocks where each block contains a sequence of N entries. Blocks may include various components such as shown in FIG. 7B. The linking of the blocks (shown by arrows in FIG. 7A) may be generated by adding a hash of a prior block's header within a block header of a current block. In this way, all entries on the blockchain 732 are sequenced and cryptographically linked together preventing tampering with blockchain data without breaking the hash links. Furthermore, because of the links, the latest block in the blockchain 732 represents every entry that has come before it. The blockchain 732 may be stored on a peer file system (local or attached storage), which supports an append-only blockchain workload.

The current state of the blockchain 732 and the distributed ledger 732 may be stored in the state database 734. Here, the current state data represents the latest values for all keys ever included in the chain entry log of the blockchain 732. Chaincode invocations execute entries against the current state in the state database 734. To make these chaincode interactions extremely efficient, the latest values of all keys are stored in the state database 734. The state database 734 may include an indexed view into the entry log of the blockchain 732, it can therefore be regenerated from the chain at any time. The state database 734 may automatically get recovered (or generated if needed) upon peer startup, before entries are accepted.

Endorsing nodes receive entries from clients and endorse the entry based on simulated results. Endorsing nodes hold smart contracts which simulate the entry proposals. When an endorsing node endorses an entry, the endorsing nodes creates an entry endorsement which is a signed response from the endorsing node to the client application indicating the endorsement of the simulated entry. The method of endorsing an entry depends on an endorsement policy which may be specified within chaincode. An example of an endorsement policy is "the majority of endorsing peers must endorse the entry." Different channels may have different endorsement policies. Endorsed entries are forward by the client application to ordering service 710.

The ordering service 710 accepts endorsed entries, orders them into a block, and delivers the blocks to the committing peers. For example, the ordering service 710 may initiate a new block when a threshold of entries has been reached, a timer times out, or another condition. In the example of FIG. 7A, blockchain node 722 is a committing peer that has received a new data block 750 for storage on blockchain 730.

The ordering service 710 may be made up of a cluster of orderers. The ordering service 710 does not process entries, smart contracts, or maintain the shared ledger. Rather, the ordering service 710 may accept the endorsed entries and specifies the order in which those entries are committed to the distributed ledger 730. The architecture of the blockchain network may be designed such that the specific implementation of 'ordering' (e.g., Solo, Kafka, BFT, etc.) becomes a pluggable component.

Entries are written to the distributed ledger 730 in a consistent order. The order of entries is established to ensure that the updates to the state database 734 are valid when they are committed to the network. Unlike a cryptocurrency blockchain system (e.g., Bitcoin, etc.) where ordering occurs through the solving of a cryptographic puzzle, or mining, in this example the parties of the distributed ledger 730 may choose the ordering mechanism that best suits that network.

When the ordering service 710 initializes a new block 750, the new block 750 may be broadcast to committing peers (e.g., blockchain nodes 721, 722, and 723). In response, each committing peer validates the entry within the new block 750 by checking to make sure that the read set and the write set still match the current world state in the state database 734. Specifically, the committing peer can determine whether the read data that existed when the endorsers simulated the entry is identical to the current world state in the state database 734. When the committing peer validates the entry, the entry is written to the blockchain 732 on the distributed ledger 730, and the state database 734 is updated with the write data from the read-write set. If an entry fails, that is, if the committing peer finds that the read-write set does not match the current world state in the state database 734, the entry ordered into a block will still be included in that block, but it will be marked as invalid, and the state database 734 will not be updated.

Referring to FIG. 7B, a block 750 (also referred to as a data block) that is stored on the blockchain 732 of the distributed ledger 730 may include multiple data segments such as a block header 760, block data 770, and block metadata 780. It should be appreciated that the various depicted blocks and their contents, such as block 750 and its contents. shown in FIG. 7B are merely for purposes of example and are not meant to limit the scope of the example embodiments. In some cases, both the block header 760 and the block metadata 780 may be smaller than the block data 770 which stores entry data, however this is not a requirement. The block 750 may store transactional information of N entries (e.g., 100, 500, 1000, 2000, 3000, etc.) within the block data 770. The block 750 may also include a link to a previous block (e.g., on the blockchain 732 in FIG. 7A) within the block header 760. In particular, the block header 760 may include a hash of a previous block's header. The block header 760 may also include a unique block number, a hash of the block data 770 of the current block 750, and the like. The block number of the block 750 may be unique and assigned in an incremental/sequential order starting from zero. The first block in the blockchain may be referred to as a genesis block which includes information about the blockchain, its members, the data stored therein, etc.

The block data 770 may store entry information of each entry that is recorded within the block 750. For example, the entry data may include one or more of a type of the entry, a version, a timestamp, a channel ID of the distributed ledger 730, an entry ID, an epoch, a payload visibility, a chaincode path (deploy tx), a chaincode name, a chaincode version, input (chaincode and functions), a client (creator) identify such as a public key and certificate, a signature of the client, identities of endorsers, endorser signatures, a proposal hash, chaincode events, response status, namespace, a read set (list of key and version read by the entry, etc.), a write set (list of key and value, etc.), a start key, an end key, a list of keys, a Merkel tree query summary, and the like. The entry data may be stored for each of the N entries.

In some embodiments, the block data 770 may also store data 772 which adds additional information to the hash-linked chain of blocks in the blockchain 732. Accordingly, the data 772 can be stored in an immutable log of blocks on the distributed ledger 730. Some of the benefits of storing such data 772 are reflected in the various embodiments disclosed and depicted herein.

The block metadata 780 may store multiple fields of metadata (e.g., as a byte array, etc.). Metadata fields may include signature on block creation, a reference to a last configuration block, an entry filter identifying valid and invalid entries within the block, last offset persisted of an ordering service that ordered the block, and the like. The signature, the last configuration block, and the orderer metadata may be added by the ordering service 710. Meanwhile, a committer of the block (such as blockchain node 722) may add validity/invalidity information based on an endorsement policy, verification of read/write sets, and the like. The entry filter may include a byte array of a size equal to the number of entries in the block data 770 and a validation code identifying whether an entry was valid/invalid.

Figure 8:
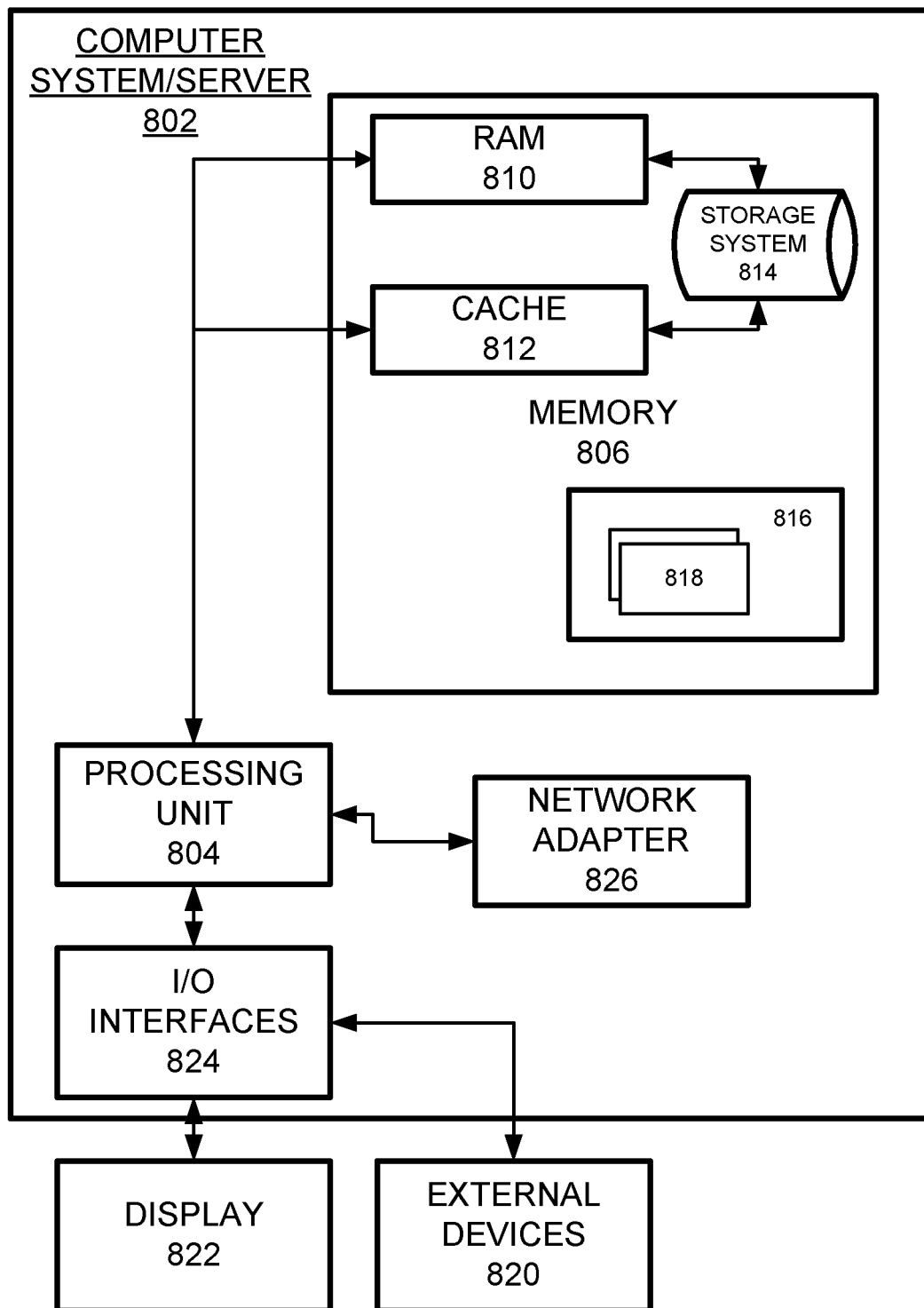
FIG. 8 illustrates an example system that supports one or more of the example embodiments.

FIG. 8 is not intended to suggest any limitation as to the scope of use or functionality of embodiments of the application described herein. Regardless, the computing node 800 is capable of being implemented and/or performing any of the functionality set forth hereinabove.

In computing node 800 there is a computer system/server 802, which is operational with numerous other general purpose or special purpose computing system environments or configurations. Examples of well-known computing systems, environments, and/or configurations that may be suitable for use with computer system/server 802 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 802 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 802 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 8, computer system/server 802 in cloud computing node 800 is shown in the form of a general-purpose computing device. The components of computer system/server 802 may include, but are not limited to, one or more processors or processing units 804, a system memory 806, and a bus that couples various system components including system memory 806 to processor 804.

The bus represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 802 typically includes a variety of computer system readable media. Such media may be any available media that is accessible by computer system/server 802, and it includes both volatile and non-volatile media, removable and non-removable media. System memory 806, in one embodiment, implements the flow diagrams of the other figures. The system memory 806 can include computer system readable media in the form of volatile memory, such as random-access memory (RAM) 810 and/or cache memory 812. Computer system/server 802 may further include other removable/non-removable, volatile/non-volatile computer system storage media. By way of example only, storage system 814 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to the bus by one or more data media interfaces. As will be further depicted and described below, memory 806 may include at least one program product having a set (e.g., at least one) of program modules that are configured to carry out the functions of various embodiments of the application.

Program/utility 816, having a set (at least one) of program modules 818, may be stored in memory 806 by way of example, and not limitation, as well as an operating system, one or more application programs, other program modules, and program data. Each of the operating system, one or more application programs, other program modules, and program data or some combination thereof, may include an implementation of a networking environment. Program modules 818 generally carry out the functions and/or methodologies of various embodiments of the application as described herein.

As will be appreciated by one skilled in the art, aspects of the present application may be embodied as a system, method, or computer program product. Accordingly, aspects of the present application may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present application may take the form of a computer program product embodied in one or more computer readable medium(s) having computer readable program code embodied thereon.

Computer system/server 802 may also communicate with one or more external devices 820 such as a keyboard, a pointing device, a display 822, etc.; one or more devices that enable a user to interact with computer system/server 802; and/or any devices (e.g., network card, modem, etc.) that enable computer system/server 802 to communicate with one or more other computing devices. Such communication can occur via I/O interfaces 824. Still yet, computer system/server 802 can communicate with one or more networks such as a local area network (LAN), a general wide area network (WAN), and/or a public network (e.g., the Internet) via network adapter 826. As depicted, network adapter 826 communicates with the other components of computer system/server 802 via a bus. It should be understood that although not shown, other hardware and/or software components could be used in conjunction with computer system/server 802. Examples, include, but are not limited to: microcode, device drivers, redundant processing units, external disk drive arrays, RAID systems, tape drives, and data archival storage systems, etc.

Although an exemplary embodiment of at least one of a system, method, and non-transitory computer readable medium has been illustrated in the accompanied drawings and described in the foregoing detailed description, it will be understood that the application is not limited to the embodiments disclosed, but is capable of numerous rearrangements, modifications, and substitutions as set forth and defined by the following claims. For example, the capabilities of the system of the various figures can be performed by one or more of the modules or components described herein or in a distributed architecture and may include a transmitter, receiver or pair of both. For example, all or part of the functionality performed by the individual modules, may be performed by one or more of these modules. Further, the functionality described herein may be performed at various times and in relation to various events, internal or external to the modules or components. Also, the information sent between various modules can be sent between the modules via at least one of: a data network, the Internet, a voice network, an Internet Protocol network, a wireless device, a wired device and/or via plurality of protocols. Also, the messages sent or received by any of the modules may be sent or received directly and/or via one or more of the other modules.

One skilled in the art will appreciate that a "system" could be embodied as a personal computer, a server, a console, a personal digital assistant (PDA), a cell phone, a tablet computing device, a smartphone or any other suitable computing device, or combination of devices. Presenting the above-described functions as being performed by a "system" is not intended to limit the scope of the present application in any way but is intended to provide one example of many embodiments. Indeed, methods, systems and apparatuses disclosed herein may be implemented in localized and distributed forms consistent with computing technology.

It should be noted that some of the system features described in this specification have been presented as modules, in order to more particularly emphasize their implementation independence. For example, a module may be implemented as a hardware circuit comprising custom very large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, comprise one or more physical or logical blocks of computer instructions that may, for instance, be organized as an object, procedure, or function. Nevertheless, the executables of an identified module need not be physically located together but may comprise disparate instructions stored in different locations which, when joined logically together, comprise the module and achieve the stated purpose for the module. Further, modules may be stored on a computer-readable medium, which may be, for instance, a hard disk drive, flash device, random access memory (RAM), tape, or any other such medium used to store data.

Indeed, a module of executable code could be a single instruction, or many instructions, and may even be distributed over several different code segments, among different programs, and across several memory devices. Similarly, operational data may be identified and illustrated herein within modules and may be embodied in any suitable form and organized within any suitable type of data structure. The operational data may be collected as a single data set or may be distributed over different locations including over different storage devices, and may exist, at least partially, merely as electronic signals on a system or network.

It will be readily understood that the components of the application, as generally described and illustrated in the figures herein, may be arranged and designed in a wide variety of different configurations. Thus, the detailed description of the embodiments is not intended to limit the scope of the application as claimed but is merely representative of selected embodiments of the application.

One having ordinary skill in the art will readily understand that the above may be practiced with steps in a different order, and/or with hardware elements in configurations that are different than those which are disclosed. Therefore, although the application has been described based upon these preferred embodiments, it would be apparent to those of skill in the art that certain modifications, variations, and alternative constructions would be apparent.

While preferred embodiments of the present application have been described, it is to be understood that the embodiments described are illustrative only and the scope of the application is to be defined solely by the appended claims when considered with a full range of equivalents and modifications (e.g., protocols, hardware devices, software platforms etc.) thereto.

What is claimed is:

1. A system, comprising:
a client node configured to transmit an entry to a blockchain database;
a computing node configured to
receive the entry intended for the blockchain database;
identify a plurality of data fields associated with the entry;
identify a plurality of data fields associated with one or more previously committed entries;
add the entry to the blockchain database with a temporary status;
determine whether one or more of the plurality of data fields associated with the entry match one or more of the plurality of data fields associated with the one or more previously committed entries; and
responsive to a determination as to whether the match occurred, determine whether to commit the entry to the blockchain database and a status to assign the entry.

2. The system of claim 1, wherein the computing node is further configured to
commit the entry to the blockchain database; and
assign the entry a rejected status when one or more of the plurality of data fields associated with the data entry match one or more of the plurality of data fields associated with the previously committed entries.

3. The system of claim 1, wherein the computing node is further configured to
commit the entry to the blockchain database; and
assign the entry an accepted status when none of the plurality of data fields associated with the data entry match any of the plurality of data fields associated with the previously committed entries.

4. The system of claim 1, wherein the blockchain database comprises a database blockchain.

5. The system of claim 4, wherein the entry is added to the blockchain database with a temporary status by the computing node being configured to add the entry to a temporary storage location and when the entry is rejected the entry is committed to the blockchain with a rejected status.

6. The system of claim 4, wherein the computing node is configured to execute a smart contract comprising instructions on whether to accept or reject the entry in the blockchain.

7. The system of claim 1, wherein the computing node is further configured to identify whether a key data field among the plurality of data fields associated with the entry matches a key data field among the plurality of data fields associated with the one or more previously committed entries; and responsive to the key data field match occurrence, reject the entry.

8. A method, comprising:
receiving an entry intended for a blockchain database;
identifying a plurality of data fields associated with the entry;
identifying a plurality of data fields associated with one or more previously committed entries;
adding the entry to the blockchain database with a temporary status;
determining whether one or more of the plurality of data fields associated with the entry match one or more of the plurality of data fields associated with the one or more previously committed entries; and
responsive to determining whether the match occurred, determining whether to commit the entry to the blockchain database and a status to assign the entry.

9. The method of claim 8, further comprising:
committing the entry to the blockchain database; and
assigning the entry a rejected status when one or more of the plurality of data fields associated with the data entry match one or more of the plurality of data fields associated with the previously committed entries.

10. The method of claim 8, further comprising:
committing the entry to the blockchain database; and
assigning the entry an accepted status when none of the plurality of data fields associated with the data entry match any of the plurality of data fields associated with the previously committed entries.

11. The method of claim 8, wherein the blockchain database comprises a database blockchain.

12. The method of claim 11, wherein adding the entry to the blockchain database with a temporary status comprises adding the entry to a temporary storage location and when the entry is rejected committing the entry to the blockchain with a rejected status.

13. The method of claim 11, further comprising:
executing a smart contract comprising instructions on whether to accept or reject the entry in the blockchain.

14. The method of claim 8, further comprising:
identifying whether a key data field among the plurality of data fields associated with the entry matches a key data field among the plurality of data fields associated with the one or more previously committed entries; and
responsive to determining that the key data field match occurred, rejecting the entry.

15. A non-transitory computer readable storage medium configured to store instructions that when executed cause a processor to perform:
receiving an entry intended for a blockchain database;
identifying a plurality of data fields associated with the entry;
identifying a plurality of data fields associated with one or more previously committed entries;
adding the entry to the blockchain database with a temporary status;
determining whether one or more of the plurality of data fields associated with the entry match one or more of the plurality of data fields associated with the one or more previously committed entries; and
responsive to determining whether the match occurred, determining whether to commit the entry to the blockchain database and a status to assign the entry.

16. The non-transitory computer readable storage medium of claim 15, wherein the processor is further configured to perform:
committing the entry to the blockchain database; and
assigning the entry a rejected status when one or more of the plurality of data fields associated with the data entry match one or more of the plurality of data fields associated with the previously committed entries.

17. The non-transitory computer readable storage medium of claim 15, wherein the processor is further configured to perform:
committing the entry to the blockchain database; and
assigning the entry an accepted status when none of the plurality of data fields associated with the data entry match any of the plurality of data fields associated with the previously committed entries.

18. The non-transitory computer readable storage medium of claim 15, wherein the blockchain database comprises a database blockchain.

19. The non-transitory computer readable storage medium of claim 18, wherein adding the entry to the blockchain database with a temporary status comprises adding the entry to a temporary storage location and when the entry is rejected committing the entry to the blockchain with a rejected status.

20. The non-transitory computer readable storage medium of claim 18, wherein the processor is further configured to perform:
executing a smart contract comprising instructions on whether to accept or reject the entry in the blockchain;
identifying whether a key data field among the plurality of data fields associated with the entry matches a key data field among the plurality of data fields associated with the one or more previously committed entries; and
responsive to determining that the key data field match occurred, rejecting the entry.

* * * * *